United States Patent
Wang et al.

(10) Patent No.: US 9,838,920 B2
(45) Date of Patent: *Dec. 5, 2017

(54) METHOD, APPARATUS, AND SYSTEM FOR DETECTING A RADIO NETWORK PROBLEM

(71) Applicant: HUAWEI TECHNOLOGIES CO., LTD., Shenzhen (CN)

(72) Inventors: Xuelong Wang, Beijing (CN); Jun Wang, Shanghai (CN); Ying Huang, Shanghai (CN); Peter Legg, Kista (SE); Johan Johansson, Kungsangen (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,953

(22) Filed: Mar. 10, 2014

(65) Prior Publication Data

US 2014/0194123 A1     Jul. 10, 2014

Related U.S. Application Data

(63) Continuation of application No. 13/252,902, filed on Oct. 4, 2011, and a continuation of application No.
(Continued)

(30) Foreign Application Priority Data

Feb. 20, 2009  (CN) .......................... 2009 1 0078405

(51) Int. Cl.
*H04W 36/00*     (2009.01)
*H04W 24/08*     (2009.01)
(Continued)

(52) U.S. Cl.
CPC ....... *H04W 36/0055* (2013.01); *H04W 24/08* (2013.01); *H04W 76/027* (2013.01); *H04W 24/04* (2013.01)

(58) Field of Classification Search
CPC .................................. H04W 36/0055
(Continued)

(56) References Cited

U.S. PATENT DOCUMENTS 8,121,589 B2 *   2/2012   Fischer et al. ................ 455/423
8,369,286 B2     2/2013   Hamabe et al.
(Continued)

FOREIGN PATENT DOCUMENTS

CN        1511138 A        7/2004
CN        1852531          10/2006
(Continued)

OTHER PUBLICATIONS

U.S. Appl. No. 13/213,944, filed Sep. 27, 2011.
(Continued)

*Primary Examiner* — Christopher M Brandt
*Assistant Examiner* — Scott Au
(74) *Attorney, Agent, or Firm* — Huawei Technologies Co., Ltd.

(57) ABSTRACT

A system, base station and method are disclosed for detecting a radio network problem. For a handover failure occurs on a user equipment (UE), a first base station receives, problem information about the occurred handover failure from the UE, after a radio resource control (RRC) connection is reestablished or established between the UE and a cell controlled by the first base station. The first base station then transmits the received problem information to a second base station controlling a cell where the handover failure occurs. In this way, the network side can automatically identify and detect the handover failure. As such, the network can
(Continued)

perform self-adjustment and optimization, therefore improving the network performance and satisfying use requirements of users.

41 Claims, 6 Drawing Sheets

Related U.S. Application Data

13/213,944, filed on Aug. 19, 2011, now abandoned, and a continuation of application No. PCT/CN2010/070639, filed on Feb. 11, 2010.

(51) Int. Cl.
*H04W 76/02* (2009.01)
*H04W 24/04* (2009.01)

(58) Field of Classification Search
USPC .............................. 455/421, 424, 436, 442
See application file for complete search history.

(56) References Cited

U.S. PATENT DOCUMENTS

| | | | |
|---|---|---|---|
| 2002/0082032 | A1 | 6/2002 | Hunzinger |
| 2006/0203738 | A1 | 9/2006 | Fok et al. |
| 2007/0238464 | A1* | 10/2007 | Lim et al. ................ 455/436 |
| 2007/0281683 | A1 | 12/2007 | Goulet et al. |
| 2008/0076405 | A1 | 3/2008 | Jen |
| 2008/0167041 | A1 | 7/2008 | Wang et al. |
| 2008/0233941 | A1* | 9/2008 | Jen ................................ 455/418 |
| 2008/0261600 | A1 | 10/2008 | Somasundaram et al. |
| 2009/0137265 | A1 | 5/2009 | Flore et al. |
| 2009/0227251 | A1* | 9/2009 | Lei et al. ................ 455/425 |
| 2010/0208707 | A1 | 8/2010 | Hamabe et al. |
| 2010/0267378 | A1* | 10/2010 | Hamabe ............... H04W 24/10 455/423 |
| 2010/0296415 | A1 | 11/2010 | Sachs et al. |
| 2011/0190016 | A1 | 8/2011 | Hamabe et al. |
| 2011/0300896 | A1 | 12/2011 | Wang et al. |

FOREIGN PATENT DOCUMENTS

| | | |
|---|---|---|
| CN | 1852531 A | 10/2006 |
| CN | 1874582 | 12/2006 |
| CN | 1874582 A | 12/2006 |
| CN | 1890928 | 1/2007 |
| CN | 1890928 A | 1/2007 |
| CN | 1511138 | 7/2007 |
| CN | 101132611 | 2/2008 |
| CN | 101132611 A | 2/2008 |
| CN | 101150380 | 3/2008 |
| CN | 101150380 A | 3/2008 |
| CN | 101171862 | 4/2008 |
| CN | 101171862 A | 4/2008 |
| KR | 10-2007-0046980 | 5/2007 |
| KR | 20070046980 A | 5/2007 |
| WO | 02061998 A2 | 8/2002 |
| WO | 2007130324 A2 | 11/2007 |
| WO | WO 2009084998 * | 1/2008 ............ H04Q 7/38 |
| WO | 2008016944 A2 | 2/2008 |
| WO | WO/2008/025288 | 3/2008 |
| WO | 2008131401 A1 | 10/2008 |
| WO | WO/2008/131401 | 10/2008 |
| WO | 2008151325 A1 | 12/2008 |
| WO | WO/2008/151325 | 12/2008 |
| WO | 2009022752 A1 | 2/2009 |
| WO | WO/2009/041498 | 2/2009 |
| WO | WO/2009022752 A1 | 2/2009 |
| WO | 2009041498 A1 | 4/2009 |
| WO | 2009084998 A1 | 7/2009 |
| WO | 2010080849 A2 | 7/2010 |

OTHER PUBLICATIONS

International Search Report in corresponding PCT Application No. PCT/CN2010/070639 (dated May 13, 2010).
Written Opinion of the International Searching Authority in corresponding PCT Application No. PCT/CN2010/070639 (dated May 13, 2010).
"3GPP TS 36.300—3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Jun. 2010, Version 10.0.0, 3$^{rd}$ Generation Partnership Project, Valbonne, France.
"3GPP TS 36.331—3$^{rd}$ Generation Partnership Project; Technical Specification Group Radio Access Network; Evolved Universal Terrestrial Radio Access (E-UTRA); Radio Resource Control (RRC) Protocol specification (Release 9)," Sep. 2008, Version 8.3.0, 3rd Generation Partnership Project, Valbonne, France.
"3GPP TS 36.331—3$^{rd}$ Generation Partnership Project; Technical Specification Group Radio Access Network; Evolved Universal Terrestrial Radio Access (E-UTRA); Radio Resource Control (RRC) Protocol specification (Release 9)," Sep. 2010, Version 9.4.0, 3$^{rd}$ Generation Partnership Project, Valbonne, France.
"3GPP TS 36.423—3$^{rd}$ Generation Partnership Project; Technical Specification Group Radio Access Network; Evolved Universal Terrestrial Radio Access Network (E-UTRAN); X2 application protocol (X2AP) (Release 8), " Sep. 2008, Version 8.3.0, 3$^{rd}$ Generation Partnership Project, Valbonne, France.
"3GPP TS 36.423—3$^{rd}$ Generation Partnership Project; Technical Specification Group Radio Access Network; Evolved Universal Terrestrial Radio Access Network (E-UTRAN); X2 application protocol (X2AP) (Release 9)," Sep. 2010, Version 9.4.0, 3$^{rd}$ Generation Partnership Project, Valbonne, France.
"R3-093370—Change Request," 3GPP TSG-RAN3 Meeting #66, Nov. 9-13, 2009, 3$^{rd}$ Generation Partnership Project, Jeju Island, South Korea.
"R3-093379—Change Request," 3GPP TSG-RAN3 Meeting #66, Nov. 9-13, 2009, 3$^{rd}$ Generation Partnership Project, Jeju Island, South Korea.
"R3-093380—Change Request," 3GPP TSG-RAN WG3 Meeting #66, Nov. 9-13, 2009, 3$^{rd}$ Generation Partnership Project, Jeju Island, South Korea.
"R3-100510—Change Request," 3GPP TSG-RAN WG3 Meeting #66bis, Jan. 18-22, 2010, 3$^{rd}$ Generation Partnership Project, Valencia, Spain.
"R2-101843—Change Request," 3GPP TSG-WG2 Meeting #68bis, Jan. 18-22, 2010, 3$^{rd}$ Generation Partnership Project, Valencia, Spain.
Office Action of corresponding U.S. Appl. No. 13/213,944, dated Feb. 22, 2012, 17 pages total.
Office Action issued in corresponding EP application No. 10743417.7, dated Oct. 8, 2012, total 5 pages.
Office Action issued in corresponding Japanese application No. 2011-550410, dated Oct. 23, 2012, and an English translation thereof, total 6 pages.
Office Action issued in corresponding Korean application No. 10-2011-7020681, dated Jan. 28, 2013, and an English translation thereof, total 7 pages.
Office Action issued in corresponding Chinese application No. 201080007810.X, dated Mar. 5, 2013, and an English translation thereof, total 20 pages.
Janne Kurjenniemi et al., "Suitability of RSRQ Measurement for Quality Based Inter-Frequency Handover in LTE", IEEE ISWCS 2008, total 5 pages.
Office Action issued in corresponding Australia application No. 2010214982, dated Mar. 28, 2013, total 3 pages.
Korean Notice of Allowance dated Feb. 21, 2014 in corresponding Korean Patent Application No. 10-2011-7020681 (2 pages) (1 page English Translation).
Chinese Office Action dated Jul. 1, 2013 in corresponding Chinese Application No. 201210145261.3.
Japanese Office Action dated Aug. 6, 2013 in corresponding Japanese Application No. 2011-550410.

(56) References Cited

OTHER PUBLICATIONS

Search Report dated May 24, 2013, in corresponding Chinese Application No. 201210145261.3 (8 pp.).
1st Non-Final Office Action dated Jan. 9, 2012 in parent U.S. Appl. No. 13/252,902 (8 pages).
2nd Non-Final Office Action dated Aug. 10, 2012 in parent U.S. Appl. No. 13/252,902 (9 pages).
3rd Non-Final Office Action dated Jul. 26, 2013 in parent U.S. Appl. No. 13/252,902 (8 pages).
Notice of Allowance dated Dec. 10, 2013 in parent U.S. Appl. No. 13/252,902 (11 pages).
Non-Final Office Action dated Feb. 22, 2012 in parent U.S. Appl. No. 13/213,944 (13 pages).
U.S. Appl. No. 13/252,902, filed Oct. 4, 2011, Wang et al., Huawei Technologies Co., LTD. Shenzhen, P.R. China.
U.S. Appl. No. 13/213,944, filed Aug. 19, 2011, Wang et al., Huawei Technologies Co., LTD. Shenzhen, P.R. China.
3GPP TSG-RAN WG3 #61bis; Discovery of neighbor eNB IP address; Qualcomm Europe, Nortel; Agenda Item: Prague, Czech Republic; Sep. 30-Oct. 3, 2008; R3-082456; total 3 pages.
3GPP TS 36.300 V10.0.0; 3rd Generation Partnership Project; Technical Specification Group Radio Access Network; Evolved Universal Terrestrial Radio Access (E-UTRA) and Evolved Universal Terrestrial Radio Access Network; (E-UTRAN); Overall description; Stage 2 (Release 10); Jun. 2010; total 183 pages.
3GPP TS 36.331 V9.4.0; 3rd Generation Partnership Project; Technical Specification Group Radio Access Network; Evolved Universal Terrestrial Radio Access (E-UTRA); Radio Resource Control (RRC); Protocol specification (Release 9); Sep. 2010; total 252 pages.
3GPP TS 36.423 V9.4.0; 3rd Generation Partnership Project; Technical Specification Group Radio Access Network; Evolved Universal Terrestrial Radio Access Network (E-UTRAN); X2 application protocol (X2AP) (Release 9); Sep. 2010; total 121 pages.
3GPP TSG-WG2 Meeting #68bis; Support of UE-originated RLFreporting for Mobility Robustness SON use case; Nokia Siemens Networks, Nokia Corporation, Deutsche Telekom, Panasonic; R2-101843; Valencia, Spain, Jan. 18-22, 2010; total 6 pages.
3GPP TSG-RAN WG3 Meeting #66; Introduction of MRO procedures in stage 2; Motorola, Huawei, Samsung, Qualcomm Europe, ZTE, Ericsson; R3-093370; Jeju, Korea, Nov. 9-13, 2009; total 5 pages.
3GPP TSG-RAN3 Meeting #66; Introduction of Radio Link Failure Indication procedure; Huawei, Motorola, ZTE, Ericsson, Qualcomm Europe, Samsung, CATT, Nokia Siemens Network, NEC, NTT DOCOMO, Fujitsu, Alcatel-Lucent; R3-093379; Jeju Island, South Korea, Nov. 9-13, 2009; total 13 pages.
3GPP TSG-RAN WG3 Meeting #66; Introduction of Handover Report procedure; Huawei, Motorola, ZTE, Ericsson, Qualcomm Europe, Samsung, CATT, Nokia Siemens Network, NEC, NTT DOCOMO, Fujitsu, Alcatel-Lucent; R3-093380; Jeju Island, South Korea, Nov. 9-13, 2009; total 14 pages.
3GPP TSG-RAN WG3 Meeting #66bis; Clarification of definitions of HO failure cases; Huawei, Vodafone; R3-100510; Valencia, Spain, Jan. 18-22, 2010; total 3 pages.
3GPP TS 36.331 V8.3.0; 3rd Generation Partnership Project; Technical Specification Group Radio Access Network; Evolved Universal Terrestrial Radio Access (E-UTRA) Radio Resource Control (RRC); Protocol specification (Release 8); Sep. 2008; total 178 pages.
3GPP TS 36.423 V8.3.0; 3rd Generation Partnership Project; Technical Specification Group Radio Access Network; Evolved Universal Terrestrial Radio Access Network (E-UTRAN); X2 application protocol (X2AP) (Release 8); Sep. 2008; total 85 pages.
Janne Kurjenniemi et al; Suitability of RSRQ measurement for quality based iner-frequency handover in LTE; IEEE ISWCS 2008; Magister Solutions Ltd, Nokia; Oct. 24, 2008; total 5 pages.
3GPP TSG RAN WG2 Meeting #61bis R2-081697, "RLF Analysis", Huawei, Mar. 31-Apr. 3, 2008, total 3 pages.
3GPP TSG RAN WG3 Meeting #59 bis R3-080754, "Mobility Robustness Optimisation", Huawei, Mar. 31-Apr. 3, 2008, total 5 pages.
3GPP TSG-RAN WG 2 meeting #60-bis R2-080346, "RLF-based neighbour list optimization", Qualcomm Europe, Jan. 14-18, 2008, total 4 pages.
3GPP TSG-RAN WG3#63bis R3-090797, "Information exchange for Mobility Robustness Optimisation", Huawei, Mar. 23-26, 2009, total 2 pages.
3GPP TSG-RAN WG3 Meeting #63bis R3-090912, "UE measurements and logs for Mobility Robustness Optimisation", CATT, Mar. 23-26, 2009, total 3 pages.
Office action dated Jan. 22, 2013, in parent U.S. Appl. No. 13/252,902, total 20 pages.
Office action dated Jul. 31, 2014, in parent U.S. Appl. No. 13/252,902, total 13 pages.
Office action dated Feb. 27, 2015, in parent U.S. Appl. No. 13/252,902, total 15 pages.
Advisory action dated Jun. 29, 2015, in parent U.S. Appl. No. 13/252,902, total 3 pages.
Office action dated May 5, 2016, in parent U.S. Appl. No. 13/252,902, total 15 pages.

* cited by examiner

METHOD, APPARATUS, AND SYSTEM FOR DETECTING A RADIO NETWORK PROBLEM

CROSS-REFERENCE TO RELATED APPLICATIONS

This application is a continuation of U.S. patent application Ser. No. 13/252,902 filed on Oct. 4, 2011, which is a continuation of U.S. patent application Ser. No. 13/213,944, filed on Aug. 19, 2011, which is a continuation of International Application No. PCT/CN2010/070639, filed on Feb. 11, 2010, which claims priority to Chinese Patent Application No. 200910078405.6, filed on Feb. 20, 2009, all of which are hereby incorporated by reference in their entireties.

FIELD OF THE INVENTION

The present invention relates to the radio network field, and in particular, to a method, an apparatus and a system for detecting a radio network problem.

BACKGROUND OF THE INVENTION

There may be various radio network problems occur during the access of a user equipment (UE) to a radio network, for example, radio link failure (Radio Link Failure, RLF) or handover failure (Hand Over Failure, HOF), Handover Too Early, Handover Too Late, ping-pong handover.

When an RLF occurs on the UE, the UE re-establishes a radio resource control (Radio Resource Control, RRC) within a specified time; if the re-establishment fails within the specified time, the UE may initiate an RRC establishment request subsequently; when the UE receives a handover command and fails to perform a handover within the specified time, that is, an HOF occurs, the UE may perform an RRC re-establishment procedure within a specified time. Similarly, if the re-establishment fails within the specified time, the UE may also initiate an RRC establishment request. In addition, when an RLF occurs on the UE, a cell where the UE camps before the RLF occurs is referred to as a previous serving cell (P-Cell), and other cells are uniformly referred to as new cell (N-Cell). However, when an HOF occurs on the UE, because the handover concept is involved, there are three types of cell: source cell (S-Cell), target cell (T-Cell), and other cell (O-Cell).

For example, when an RLF occurs on a UE, a procedure of RRC re-establishment or establishment is shown in FIG. 1. The procedure includes the following steps.

1. An RLF occurs on the UE.
2. The UE initiates an RRC connection re-establishment or establishment procedure.

Specifically, the UE may perform the RRC connection re-establishment in the P-Cell or the N-Cell; or after the RRC re-establishment fails, the UE may initiate a subsequent RRC establishment procedure in the P-Cell or the N-Cell.

FIG. 2 is a schematic diagram of an RRC re-establishment or establishment procedure when a UE performs a handover and an HOF occurs. The procedure includes the following steps.

1. A source cell (S-Cell) performs measurement configuration on the UE.
2. The UE performs corresponding measurement.
3. If a result of the measurement meets a set condition, the UE reports a measurement report to the S-Cell.
4. The S-Cell decides to hand over the UE to a target cell (T-Cell) according to the measurement report reported by the UE.
5. The S-Cell sends a handover request message to the T-Cell.
6. The T-Cell returns a handover response message to the T-Cell.
7. The S-Cell sends a handover command to the UE.
8. In this case, if the radio signal of the T-Cell is not good, the UE may not hand over to the T-Cell within a specified time.
9. After a timer set on the UE side expires, an HOF occurs on the UE. In this case, the UE may initiate an RRC connection re-establishment procedure.

Specifically, the UE may perform the RRC connection re-establishment procedure in an S-Cell or a T-Cell or an O-Cell of a previous handover, where the O-Cell is a cell other than the S-Cell and the T-Cell; or after the RRC connection re-establishment fails, the UE initiates a subsequent RRC connection establishment procedure. Similarly, the RRC connection establishment procedure may also be performed in the S-Cell, the T-Cell or the O-Cell.

According to the solution in the prior art, no solution that can automatically identify and detect these radio network problems is available in the prior art. Consequently, various radio network problems such as Handover Too Early or Handover Too Late may occur due to parameter settings, so that call drops occur on the UE, therefore affecting a user experience.

SUMMARY OF THE INVENTION

In one aspect, the present invention provides a method for detecting a radio network problem. The method includes: when a radio network problem occurs on a UE, in a procedure of re-establishing or establishing an RRC connection by the UE or after the RRC connection has been established, a cell that an RRC connection established with the UE receives problem information about the radio network problem sent by the UE, and forwards the problem information to a server or a cell where the radio network problem occurs.

In another aspect, the present invention provides an apparatus for detecting a radio network problem. The apparatus includes a problem information receiving unit configured to: when a radio network problem occurs on a UE, in a procedure of re-establishing or establishing an RRC connection by the UE or after the RRC connection has been established, receive problem information about the radio network problem sent by the UE, and forward the problem information to a server or a cell where the radio network problem occurs.

In another aspect, the present invention provides a method for reporting a radio network problem. The method includes: a radio network problem occurs on a UE; and in a procedure of re-establishing or establishing an RRC connection or after establishing an RRC connection, sending problem information about the radio network problem to a cell that an RRC connection established with the UE, where the problem information includes signal quality and the signal quality includes reference signal received power (RSRP) and/or reference signal received quality (RSRQ).

In still another aspect, the present invention provides a UE. The UE includes a sending unit configured to: when a radio network problem occurs on the UE, in a procedure of establishing or re-establishing an RRC connection by the UE or after the UE establishes an RRC connection, send problem information about the radio network problem to a cell that an RRC connection established, where the problem information includes signal quality and the signal quality includes reference signal received power (RSRP) and/or reference signal received quality (RSRQ).

In still another aspect, the present invention provides a radio network system. The system includes the preceding apparatus at network side and the preceding UE.

According to the above technical solution, when a radio network problem occurs on a UE, in a procedure of re-establishing or establishing an RRC connection by the UE or after the UE establishes an RRC connection, a cell that an RRC connection established receives problem information about the radio network problem sent by the UE, and forwards the problem information to a server or a cell where the radio network problem occurs. In this way, the network side can automatically identify and detect the radio network problem which occurs on the UE, so that the network can perform self-adjustment and optimization, therefore improving the network performance and satisfying use requirements of users.

DETAILED DESCRIPTION OF THE INVENTION

Embodiments of the present invention provide a method, an apparatus, and a system for detecting a radio network problem, so that the network side can automatically identify and detect the radio network problem which occurs on the UE. In this way, the network can perform self-adjustment and optimization, therefore improving the network performance and satisfying use requirements of users.

An embodiment of the present invention provides a method for detecting a radio network problem. The method is as follows: when a radio network problem occurs on a UE, the network side receives problem information about the radio network problem sent by the UE, in a procedure of establishing an RRC connection by the UE or after the RRC connection is established. In this way, the network side can detect the radio network problem after receiving the problem information about the radio network problem, which provides a basis for the network side to optimize parameters and solve the radio network problem.

The following describes the embodiments of the present invention in detail with reference to the accompanying drawings.

Embodiment 1

Figure 1:
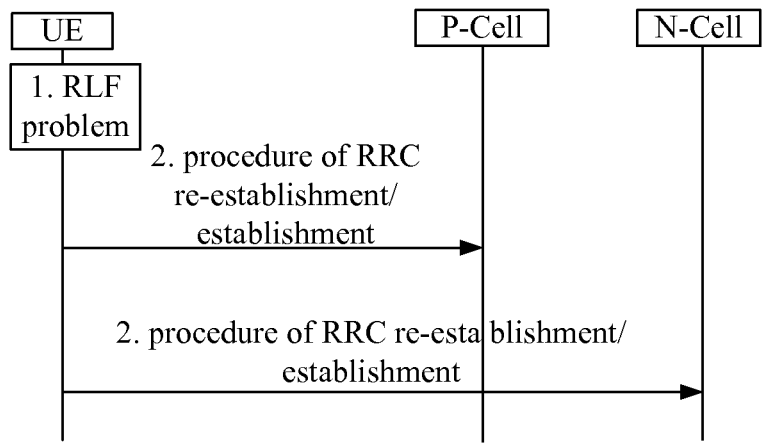
FIG. 1 is a schematic diagram of a procedure of RRC re-establishment or establishment when an RLF occurs on a UE in the prior art.
Figure 2:
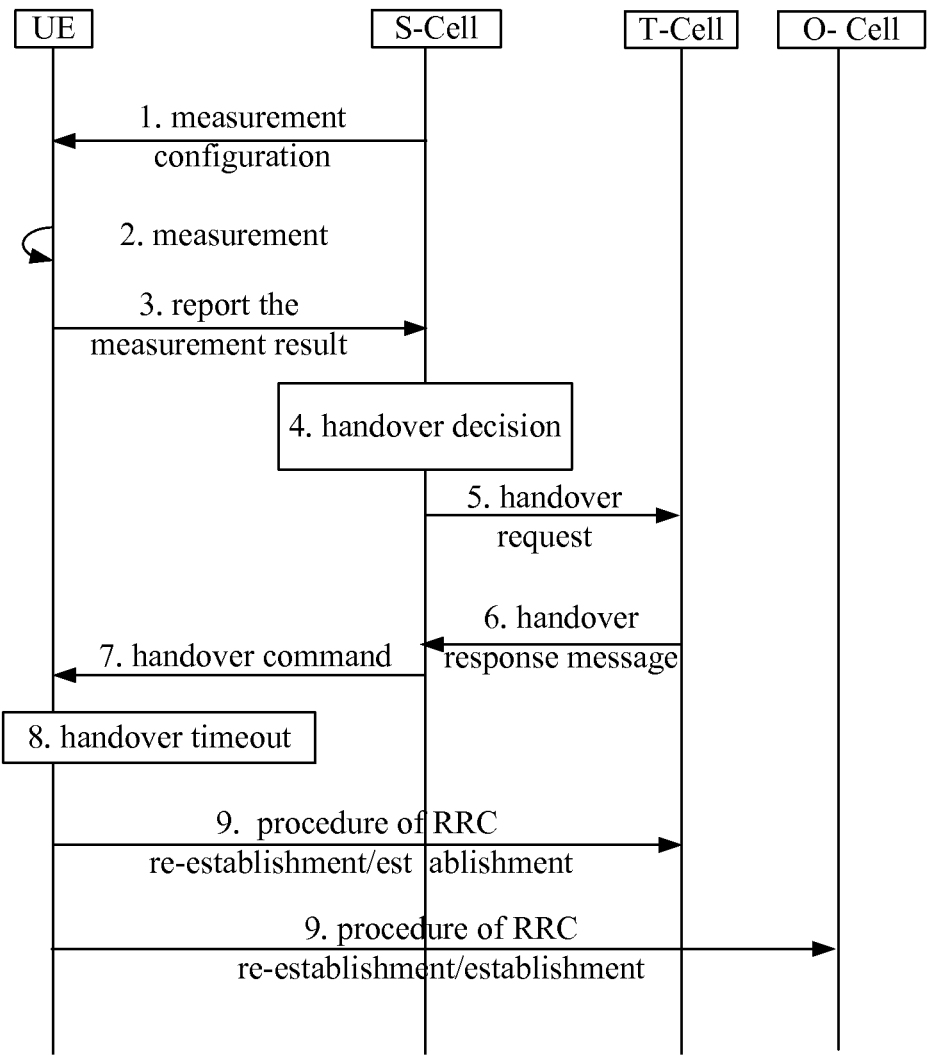
FIG. 2 is a schematic diagram of a procedure of RRC re-establishment or establishment when an HOF occurs on a UE in the prior art.
Figure 3:
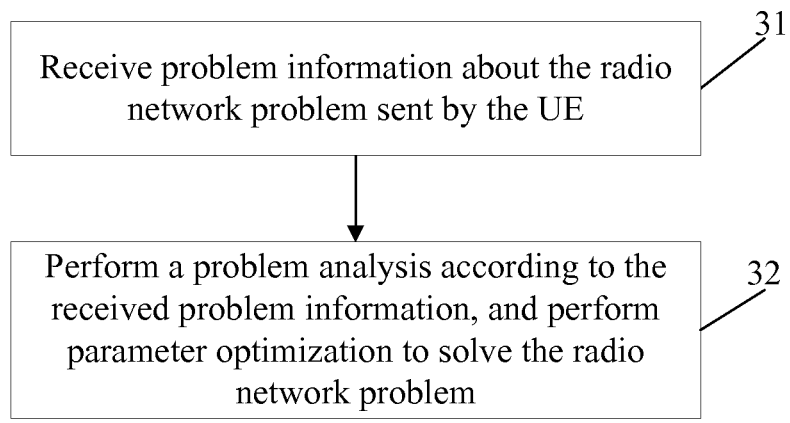
FIG. 3 is a schematic flowchart of a method according to Embodiment 1 of the present invention.

FIG. 3 is a schematic flowchart of a method for detecting a radio network problem according to Embodiment 1 of the present invention. The method includes the following content.

31. Receive problem information about a radio network problem sent by the UE.

In this step, when a radio network problem occurs on the UE, the network side receives the problem information about the radio network problem sent by the UE, in a procedure of establishing an RRC connection by the UE or after the RRC connection is established. The network side may be a cell that the RRC connection established or other network device.

The radio network problem may be a radio link failure (RLF) problem, handover failure (HOF) problem, Handover Too Early, Handover Too Late or ping-pong handover.

More specifically, the problem information may be carried in an RRC re-establishment message or an RRC establishment message in a procedure of RRC re-establishment or establishment, or be carried in other messages after the procedure of RRC re-establishment or establishment is completed, for example, the problem information may be carried in a user-defined message.

In addition, in a specific implementation procedure, if the radio network problem is an RLF problem, the problem information about the RLF may include one or more of the following: information of an error cause, identity information of a serving cell in the case of the RLF, identity information of a tracking area (TA) of the serving cell in the case of the RLF, identity information of the UE, and time information from the time when the RLF occurs to the time when the RRC re-establishment or establishment succeeds. If the radio network problem is an HOF problem, the problem information about the HOF may include one or more of the following: information of an error cause, both identity information of an S-Cell and a T-Cell in the case of the HOF, identity information of a tracking area of the S-Cell in the case of the HOF, identity information of the UE, and time information from the time when a handover command is received to the time when the RRC re-establishment or establishment succeeds.

After step 31 is executed, the network side can automatically identify and detect the radio network problem which occurs on the UE, so that the network can perform self-adjustment and optimization, therefore improving the network performance and satisfying use requirements of users.

In addition, after the network receives the problem information, step 32 may be further executed.

32. Perform a problem analysis according to the received problem information and optimize parameters to solve the radio network problem.

In a specific implementation procedure, if the network side is a cell that an RRC connection established with the UE and a radio network problem occurs in the cell, the cell directly performs a problem analysis on the received problem information and optimizes parameters to solve the radio network problem.

The network side may also forward the received problem information through the cell that an RRC connection established with the UE to a cell where the radio network problem occurs, and the cell where the radio network problem occurs performs a problem analysis on the received problem information and optimizes parameters to solve the radio network problem. In the specific implementation, the received problem information may be forwarded to the cell where the radio network problem occurs through an inter-base station interface or through transference of a network element, where the network element may be a mobility management entity (MME) in the core network, an element management system (EMS) or a network management system (NMS).

In addition, the network side may also upload the received problem information to a special server through the cell that an RRC connection established, and then the server performs analysis and processing on the received problem information. In this way, the problem may be analyzed and processed on a centralized basis. Specifically, the received problem information may be forwarded to the element management system (EMS) through a southbound interface (Itf-S); or the received problem information may be forwarded to the network management system (NMS) server through a northbound interface Itf-N for centralized analysis and processing.

In the specific implementation, the network side may adopt different processing modes according to different radio network problems which occur on the UE. Specifically, when a radio network problem occurs on the UE is a radio link failure (RLF), if the cell that an RRC connection established with the UE is a P-Cell where the RLF occurs, the P-Cell may directly perform a problem analysis on the received problem information and optimize parameters to solve the radio network problem.

If the cell that an RRC connection established with the UE is an N-Cell, the N-Cell may send the received problem information to a P-Cell where the RLF occurs. For example, the N-Cell may forward the received problem information to the P-Cell where the RLF occurs through an inter-base station interface or through transference of a network element; the P-Cell performs a problem analysis on the received problem information and optimizes parameters to solve the radio network problem.

When the radio network problem occurs on the UE is a handover failure (HOF), if the cell that an RRC connection established with the UE is an S-Cell or a P-Cell where the HOF occurs, the S-Cell or the P-Cell may directly perform a problem analysis on the received problem information and optimize parameters to solve the radio network problem.

Or, if the cell that an RRC connection established with the UE is a T-Cell, the T-Cell forwards the received problem information to an S-Cell where the HOF occurs, and the S-Cell performs a problem analysis on the received problem information and optimizes parameters to solve the radio network problem.

Or, if the cell that an RRC connection established with the UE is an O-Cell, the O-Cell forwards the received problem information to an S-Cell where an HOF occurs or a T-Cell where an HOF occurs, and the S-Cell or the T-Cell performs a problem analysis on the received problem information and optimizes parameters to solve the radio network problem.

More specifically, the problem information about the radio network problem that the network side receives from the UE may further include information such as the frequency of an old/source cell, a physical cell identity (PCI), a cell global identity (CGI), IP, a public land mobile network (PLMN) ID, and signal quality (for example, Reference Signal Received Power (RSRP), Reference Signal Received Quality (RSRQ)). The access control base station of an N-Cell/T-Cell may add a new cell adjacency relationship or trigger an establishment of an X2 interface according to the preceding information, therefore solving a radio network problem (for example, the RLF) due to weak coverage.

This embodiment provides a method for detecting a radio network problem by the network side and further provides a method for solving the network problem according to the network problem information. By using the technical solution provided in this embodiment, the network can detect the network problem which occurs on the UE in time, perform a problem analysis on the problem information, find the problem causes, and optimize parameters to solve the radio network problem.

Embodiment 2

Figure 4:
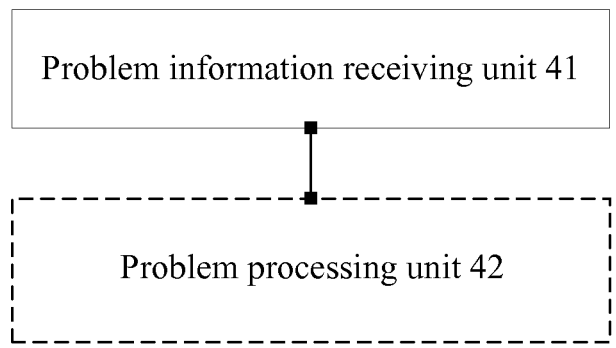
FIG. 4 is a schematic structure diagram of an apparatus according to Embodiment 2 of the present invention.

Embodiment 2 of the present invention provides an apparatus at network side for detecting a radio network problem. FIG. 4 is a schematic structure diagram of the apparatus according to the Embodiment 2 of the present invention. As shown in FIG. 4, the apparatus includes a problem information receiving unit 41.

The problem information receiving unit 41 is configured to: when a radio network problem occurs on the UE, receive problem information about the radio network problem sent by the UE, in a procedure of establishing an RRC connection by the UE or after the RRC connection is established. For the specific receiving method, refer to the description of the Embodiment 1.

In addition, the apparatus may further include a problem processing unit 42 configured to perform a problem analysis according to the problem information received by the problem information receiving unit, and optimize parameters to solve the radio network problem. The specific analysis and processing method has been described in the Embodiment 1.

The apparatus at network side for detecting a radio network problem according to this embodiment can detect a radio network problem which occurs on the UE in time, and know problem information about the radio network problem, which provides a basis for the network side to solve the radio network problem. In this way, the network side can further perform a problem analysis and optimize parameters to solve the radio network problem.

Embodiment 3

Figure 5:
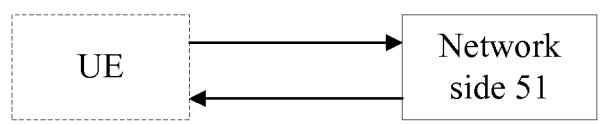
FIG. 5 is a schematic structure diagram of a system according to Embodiment 3 of the present invention.

Embodiment 3 of the present invention provides a system for detecting a radio network problem. FIG. 5 is a schematic structure diagram of the system according to the Embodiment 3 of the present invention. The system includes a network side 51 configured to: when a radio network problem occurs on the UE, receive problem information about the radio network problem sent by the UE, in a procedure of establishing an RRC connection or after the RRC connection is established.

In addition, the network 51 is further configured to perform a problem analysis according to the received problem information and optimize parameters to solve the radio network problem. For the specific problem analysis and processing method, refer to the description of the method Embodiment 1.

By using the system for detecting the radio network problem according to this embodiment, the network can detect a radio network problem which occurs on the UE in time, and know the problem information about the radio network problem, which provides a basis for the network side to solve the radio network problem. In this way, the network side can perform a problem analysis and optimize parameters to solve the radio network problem.

It should be noted that: in the preceding apparatus and system provided in embodiments of the present invention, each unit is divided only according to the function logics. However, the division is not limited thereto so long as the unit can implement corresponding functions. In addition, the specific name of each functional unit is only for the convenience of differentiation and is not intended to limit the protection scope of the present invention.

Embodiment 4

Figure 6:
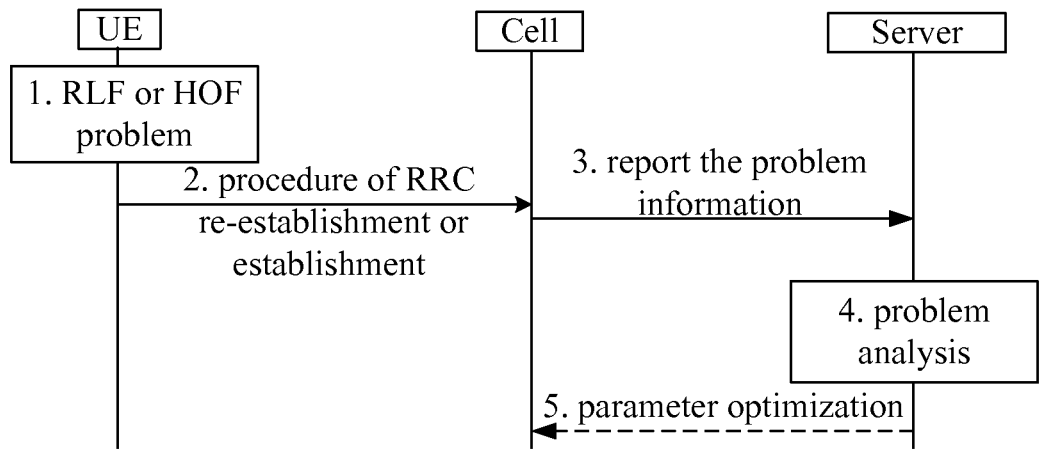
FIG. 6 is a schematic diagram of signaling interactions in a specific instance according to Embodiment 4 of the present invention.

The following describes the method for detecting a radio network problem in detail with specific instances. FIG. 6 is a schematic diagram of signaling interactions in a specific instance according to Embodiment 4 of the present invention. The procedure includes the following content.

1. An RLF or an HOF occurs on the UE.

2. In a procedure of RRC re-establishment or RRC establishment after RRC re-establishment fails performed by the UE, the cell that an RRC connection established with the UE receives problem information about the RLF or the HOF sent by the UE.

The problem information may be carried in an RRC establishment message (RRC Connection Request), an RRC re-establishment message (RRC Connection Re-establishment), or in a message extended after the UE establishes an RRC connection.

In a specific implementation procedure, if an RLF occurs, the cell that an RRC connection established with the UE includes a P-Cell and an N-Cell; if an HOF occurs, the cell that an RRC connection established with the UE includes an S-Cell, a T-Cell, and an O-Cell.

3. The cell that an RRC connection established with the UE forwards the problem information about the RLF or the HOF to a server.

Through step 1 to step 3 above, the network side detects the radio network problem. Further, the procedure of performing a problem analysis and a parameter optimization by the server according to the problem information includes the following steps:

4. The server performs a problem analysis, for example, performing problem analysis according to the problem information measured within a period of time.

5. Adjust cell parameters according to a result of the problem analysis to solve the problem.

In this way, by using the technical solution provided in the Embodiment 4 of the present invention, the network side can automatically identify and detect the radio network problem which occurs on the UE, so that the network can perform self-adjustment and optimization, therefore improving the network performance and satisfying use requirements of users.

Embodiment 5

Figure 7:
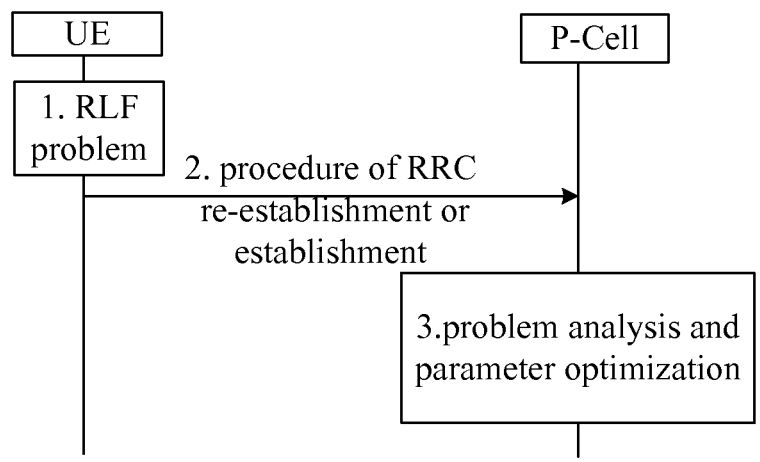
FIG. 7 is a schematic diagram of signaling interactions in a specific instance according to Embodiment 5 of the present invention.

Embodiment 5 is a solution instance after an RLF occurs on a UE. In this embodiment, a cell that receives the problem information may directly perform a problem analysis to achieve the purpose of parameter optimization. FIG. 7 is a schematic diagram of signaling interactions in a specific instance according to the Embodiment 5 of the present invention. As shown in FIG. 7, a procedure of RRC re-establishment or establishment when an RLF occurs on the UE includes the following content.

1. An RLF occurs on the UE.

2. The P-Cell receives problem information about the RLF reported by the UE, where the problem information about the RLF may be carried in an RRC establishment or re-establishment message, or be carried in a message extended after an RRC connection is established.

In a specific implementation procedure, any combination of the following parameters may be carried in the RRC establishment or re-establishment message or in the extended message to describe the problem information about the RLF:

(A) Information of an error cause, for example, RLF or HOF.

(B) Identity of a P-Cell and/or an N-Cell when an RLF occurs on the UE. In this embodiment, the identify is a related identity of a P-Cell and/or an O-Cell, for example, identity information such as frequency, Physical Cell Identity (PCI), Cell Global Identity (CGI), PLMN ID, signal quality (RSRP,RSRQ).

(C) Identity information of a Tracking Area (TA) of the serving cell when an RLF occurs on the UE.

(D) Unique identity information of the UE, for example, cell-radio network temporary identity (C-RNTI), temporary mobile subscriber identity (TMSI), and international mobile subscriber identity (IMSI). A UE related context may be found according to this parameter, so that the context of the UE may be analyzed to solve the problem better.

(E) Time information from a time when the RLF occurs on the UE to a time when the RRC establishment or re-establishment succeeds. Causes for the network problem may be inferred according to this parameter. For example, when the time value is small, it may be inferred that the problem is Handover Too Early or Handover Too Late due to improper parameter settings; when the time value is large, it may be inferred that the problem is caused by coverage holes.

Through step 1 to step 2 above, the network side detects the radio network problem. Further, the process of analysis and parameter optimization performed by the P-Cell according to the problem information include step 3:

3. The P-Cell performs problem analysis according to the problem information fed back in step 2, for example, long-term measurement is performed directly and find out the root cause of the problem by performing an analysis, and then performing cell parameter optimization to solve the problem.

Similarly, by using the technical solution provided in the Embodiment 6 of the present invention, the network side can automatically identify and detect the radio network problem which occurs on the UE, so that the network can perform self-adjustment and optimization, therefore improving the network performance and satisfying use requirements of users.

Embodiment 6

Figure 8:
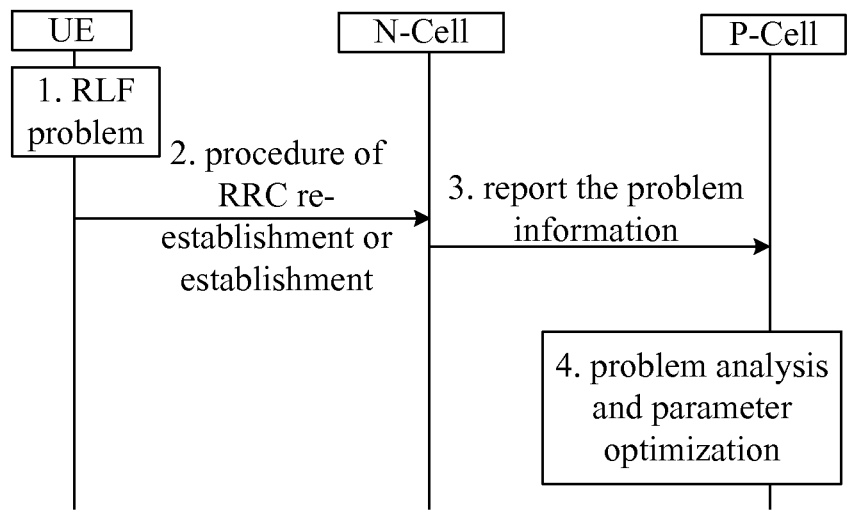
FIG. 8 is a schematic diagram of signaling interactions in a specific instance according to Embodiment 6 of the present invention.

Embodiment 6 is also a solution instance after an RLF occurs on a UE. This embodiment is different from the Embodiment 5 in that: in this embodiment, after an RLF occurs on the UE, a procedure of RRC re-establishment or establishment is performed in an N-Cell. FIG. 8 is a schematic diagram of signaling interactions in a specific instance according to the Embodiment 6. The procedure includes the following content.

1. An RLF occurs on the UE.

2. The N-Cell receives problem information about the RLF reported by the UE, where the problem information about the RLF may be carried in an RRC establishment or re-establishment message, or be carried in a message extended after the UE establishes an RRC connection.

In a specific implementation procedure, the parameter information carried in the RRC establishment or re-establishment message, or the extended message is the same as the parameter information in the Embodiment 5 of the present invention.

3. The N-Cell forwards the problem information to a P-Cell where the RLF occurs. In a specific implementation procedure, the identity of the P-Cell may be found according to the cell identity information carried in the problem information about the RLF reported by the UE.

Through step 1 to step 3 above, the network detects the radio network problem. Further, the process of analysis and parameter optimization performed by the P-Cell according to the problem information includes:

4. The P-Cell performs problem analysis according to the problem information fed back in step 3, for example, long-term measurement is performed and finding out the root cause of the problem by performing an analysis, and then performing parameter optimization to solve the problem.

Similarly, by using the technical solution provided in the Embodiment 6 of the present invention, the network side can automatically identify and detect the radio network problem which occurs on the UE, so that the network can perform self-adjustment and optimization, therefore improving the network performance and satisfying use requirements of users.

Embodiment 7

Figure 9:
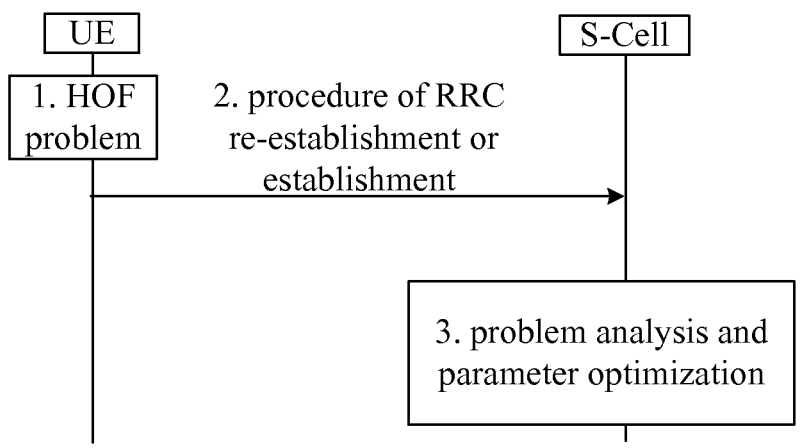
FIG. 9 is a schematic diagram of signaling interactions in a specific instance according to Embodiment 7 of the present invention.
Figure 10:
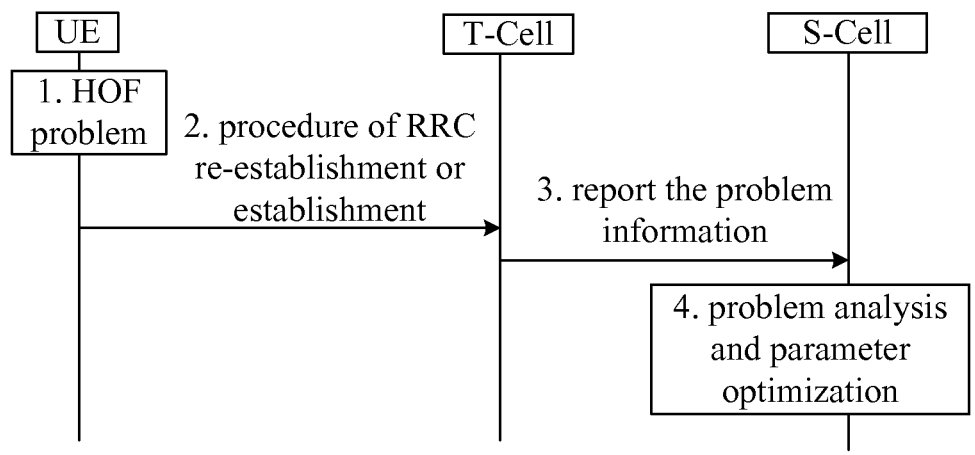
FIG. 10 is a schematic diagram of signaling interactions in a specific instance according to Embodiment 8 of the present invention.

This Embodiment 7 is a solution instance after an HOF occurs on a UE. In the Embodiment 7, a cell that receives the problem information may directly perform a problem analysis to achieve the purpose of parameter optimization. FIG. 9 is a schematic diagram of signaling interactions in a specific instance according to the Embodiment 7 of the present invention. As shown in FIG. 9, a procedure of RRC re-establishment or establishment is performed in an S-Cell when an HOF occurs on the UE includes the following content.

1. An HOF occurs on the UE.

2. The S-Cell receives problem information about the HOF reported by the UE, where the problem information about the HOF may be carried in an RRC establishment or re-establishment message, or be carried in a message extended after the UE establishes an RRC connection.

In a specific implementation procedure, the following parameters may be carried in the RRC establishment or re-establishment message or in the extended message to describe the following problem information about the HOF:

(A) Information of an error cause;

(B) Identity information of the S-Cell and a T-Cell when an HOF occurs on the UE, for example, a frequency, a physical cell identity (Physical Cell Identity, PCI), a cell global identity (Cell Global Identity, CGI), an IP, a PLMN ID, and signal quality (RSRP,RSRQ).

(C) Identity information of a tracking area (Tracking Area, TA) of the S-Cell when an HOF occurs on the UE.

(D) Unique identity of the UE, for example, a C-RNTI, a TMSI, or an IMSI.

(E) Time information from the time when the UE receives a handover command to the time when the RRC establishment or re-establishment succeeds.

Through step 1 to step 2 above, the network detects the radio network problem. Further, the process of analysis and parameter optimization performed by the S-Cell according to the problem information includes:

3. The S-Cell performs problem analysis according to the problem information fed back in step 2, for example, long-term measurement is performed and finding out the root cause of the problem by performing an analysis, and then performing parameter optimization to solve the problem.

Similarly, by using the technical solution provided in the Embodiment 7 of the present invention, the network side can automatically identify and detect the radio network problem which occurs on the UE, so that the network can perform self-adjustment and optimization, therefore improving the network performance and satisfying use requirements of users.

Embodiment 8

Embodiment 8 is also a solution instance after an HOF occurs on a UE. The Embodiment 8 is different from the Embodiment 7 in that: in the Embodiment 8, after an HOF occurs on the UE, a procedure of RRC re-establishment or establishment is performed in a T-Cell. FIG. 8 is a schematic diagram of signaling interactions in a specific instance according to the Embodiment 8. The procedure includes the following content.

1. An HOF occurs on the UE.

2. The T-Cell receives problem information about the HOF reported by the UE, where the problem information about the HOF may be carried in an establishment or re-establishment message, or be carried in a message extended after the UE establishes an RRC connection.

The parameter information carried in the establishment or re-establishment message or the extended message is the same as the parameter information in the Embodiment 7 of the present invention.

3. The T-Cell forwards the problem information to an S-Cell where the HOF occurs. In the specific implementation, the identity information of the S-Cell is obtained according to cell identity information carried in the problem information about the HOF reported by the UE.

Through step 1 to step 3 above, the network detects the radio network problem. Further, the procedure of analysis and parameter optimization performed by the S-Cell according to the problem information includes:

4. The S-Cell performs problem analysis according to the problem information fed back in step 3, for example, long-term measurement is performed and finding out the root cause of the problem by performing an analysis, and then performing parameter optimization to solve the problem.

In a specific implementation procedure, a message between the T-Cell and the S-Cell may be transferred through an existing UE CONTEXT RELEASE message or a new user-defined message.

Similarly, by using the technical solution provided in the Embodiment 8 of the present invention, the network side can automatically identify and detect the radio network problem which occurs on the UE, so that the network can perform self-adjustment and optimization, therefore improving the network performance and satisfying use requirements of users.

Embodiment 9

Figure 11:
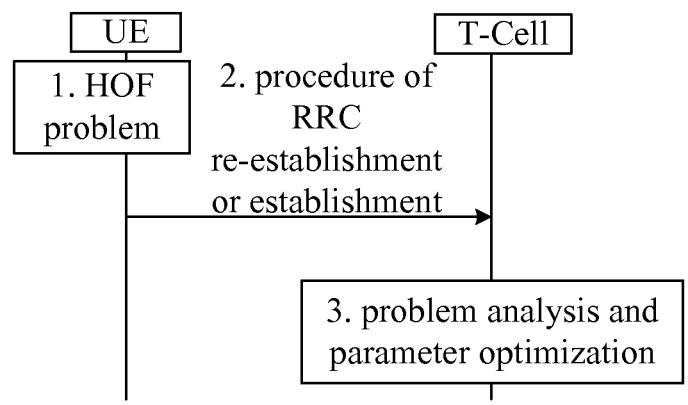
FIG. 11 is a schematic diagram of signaling interactions in a specific instance according to Embodiment 9 of the present invention.

Embodiment 9 is also a solution instance after an HOF occurs on a UE. After the HOF occurs, a procedure of RRC re-establishment or establishment is performed in a T-Cell. This embodiment 9 is different from the Embodiment 8 in that: in this embodiment 9, the T-Cell directly performs corresponding problem analysis and processing. FIG. 11 is a schematic diagram of signaling interactions in a specific instance according to the Embodiment 9 of the present invention. The procedure includes the following content.

1. An HOF occurs on the UE.
2. The T-Cell receives problem information about the HOF reported by the UE, where the problem information about the HOF may be carried in an RRC establishment or re-establishment message, or be carried in a message extended after the UE establishes an RRC connection.

The parameter information carried in the RRC establishment or re-establishment message or the extended message is the same as the parameter information in the Embodiment 7 of the present invention.

Through step 1 to step 2 above, the network side detects the radio network problem. Further, the procedure of analysis and parameter optimization performed by the T-Cell according to the problem information includes:

3. The T-Cell performs problem analysis according to the problem information fed back in step 2, for example, long-term measurement is performed and finding out the root cause of the problem by performing an analysis, and then performing parameter optimization to solve the problem.

Similarly, by using the technical solution provided in the Embodiment 9 of the present invention, the network can automatically identify and detect the radio network problem which occurs on the UE, so that the network can perform self-adjustment and optimization, therefore improving the network performance and satisfying use requirements of users.

Embodiment 10

Figure 12:
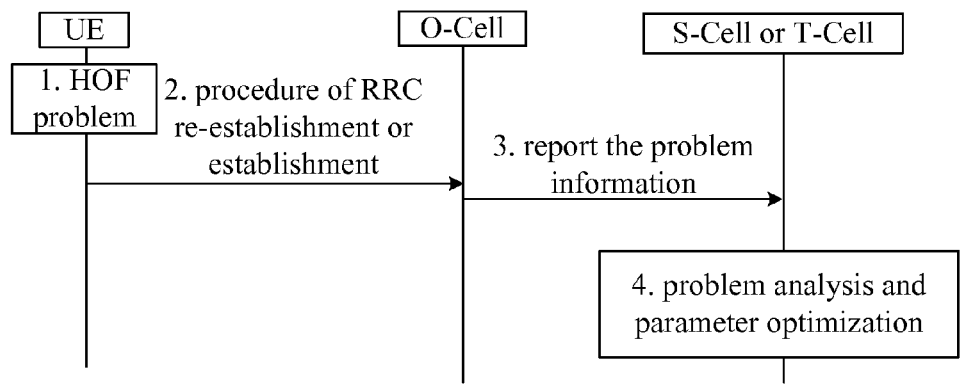
FIG. 12 is a schematic diagram of signaling interactions in a specific instance according to Embodiment 10 of the present invention.

Embodiment 10 is also a solution instance after an HOF occurs on a UE. The Embodiment 10 is different from the Embodiment 9 in that: in the Embodiment 9, after the HOF occurs, a procedure of RRC re-establishment or establishment is performed in an O-Cell. FIG. 12 is a schematic diagram of signaling interactions in a specific instance according to the Embodiment 10. The procedure includes the following content.

1. An HOF occurs on the UE.
2. The O-Cell receives problem information about the HOF reported by the UE, where the problem information about the HOF may be carried in an RRC establishment or re-establishment message, or be carried in a message extended after the UE establishes an RRC connection.

The parameter information carried in the RRC establishment or re-establishment message or the extended message is the same as the parameter information in the Embodiment 7 of the present invention.

3. The O-Cell forwards the problem information to an S-Cell or a T-Cell where the HOF occurs. In a specific implementation procedure, the identity information of the S-Cell or the T-Cell may be obtained according to the cell identity information carried in the problem information about the HOF reported by the UE.

Through step 1 to step 3 above, the network side detects the radio network problem. Further, the process of analysis and parameter optimization performed by the S-Cell according to the problem information includes:

4. The S-Cell or the T-Cell performs problem analysis according to the problem information fed back in step 3, for example, long-term measurement is performed and finding out the root cause of the problem by performing an analysis, and then performing parameter optimization to solve the problem.

By using the technical solution provided in the Embodiment 10 of the present invention, the network side can automatically identify and detect the radio network problem which occurs on the UE, so that the network can perform self-adjustment and optimization, therefore improving the network performance and satisfying use requirements of users.

It is understandable to those skilled in the art that all or part of the steps in the methods provided in the preceding embodiments may be performed by hardware instructed by a program. The program may be stored in a computer readable storage medium, such as a read only memory, a magnetic disk, and a compact disk-read only memory (CD-ROM).

In conclusion, by using the method, apparatus and system for detecting the radio network problem according to embodiments of the present invention, the network side can automatically identify and detect the radio network problem which occurs on the UE, so that the network can perform self-adjustment and optimization, therefore improving the network performance and satisfying use requirements of users.

The above descriptions are merely exemplary embodiments of the present invention, but not intended to limit the scope of the present invention. Any modification, equivalent replacement, or improvement made without departing from the spirit and principle of the present invention should fall within the protection scope of the present invention. Therefore, the protection scope of the present invention is subject to the appended claims.

What is claimed is:

1. A radio network system for detecting a radio network problem, the system comprising:
    a first base station controlling a new cell; and
    a second base station controlling a previous cell,
    wherein the first base station is configured to:
    receive, from a user equipment (UE), problem information indicating a handover failure occurred on the UE in the previous cell controlled by the second base station, after a radio resource control (RRC) connection is reestablished or established between the UE and the new cell; and
    transmit, upon receiving the problem information, the received problem information to the second base station controlling the previous cell, wherein the problem information is used by the second base station to perform a problem analysis to the handover failure according to the problem information, and to perform parameter optimization to solve the handover failure.

2. The system of claim 1, wherein the previous cell is a source cell (S-Cell) and the new cell is a target cell (T-Cell), and wherein the problem information includes signal quality of at least one of the S-Cell and the T-Cell.

3. The system of claim 2, wherein the signal quality includes at least one of reference signal received power (RSRP) and reference signal received quality (RSRQ).

4. The system of claim 1, wherein the previous cell is a source cell (S-Cell), and wherein the problem information includes identify information of the S-Cell when the handover failure occurs, and the identify information of the S-Cell includes at least one of a frequency, a physical cell identity (PCI), a cell global identity (CGI), an IP, and a PLMN ID of the S-Cell.

5. The system of claim 1, wherein the new cell is a target cell (T-Cell), and wherein the problem information includes identify information of the T-Cell when the handover failure occurs, and the identify information of the T-Cell includes at least one of a frequency, a physical cell identity (PCI), a cell global identity (CGI), an IP, and a PLMN ID of the T-Cell.

6. The system of claim 1, wherein the previous cell is a source cell (S-Cell), and the problem information includes identity information of a tracking area (TA) of the S-Cell when the handover failure occurs.

7. The system of claim 1, wherein the problem information includes identity information of the UE, and the identify information of the UE includes a cell-radio network temporary identity (C-RNTI) of the UE, a temporary mobile subscriber identity (TMSI) of the UE, or an international mobile subscriber identity (IMSI) of the UE.

8. The system of claim 1, wherein in transmitting the problem information operation, the transmitter is configured to transmit the problem information to the second base station through an interface between the first and second base stations; or through transference of a mobility management entity (MME) in a core network, an element management system (EMS), or a network management system (NMS).

9. The radio network system according to claim 1, wherein the second base station is configured to receive the problem information in a message transmitted by the UE to the first base station.

10. A base station comprising:
a receiver configured to receive, from a user equipment (UE), problem information indicating a handover failure occurred on the UE in a previous cell controlled by another base station, after a radio resource control (RRC) connection is reestablished or established between the UE and a new cell controlled by the base station; and
a transmitter configured to transmit the received problem information to the another base station controlling the previous cell, wherein the problem information is used by the another base station to perform a problem analysis to the handover failure according to the problem information, and to perform parameter optimization to solve the handover failure.

11. The base station of claim 10, wherein the previous cell is a source cell (S-Cell) and the new cell is a target cell (T-Cell), and wherein the problem information includes signal quality of at least one of the S-Cell and the T-Cell.

12. The base station of claim 11, wherein the signal quality includes at least one of reference signal received power (RSRP) and reference signal received quality (RSRQ).

13. The base station of claim 10, wherein the previous cell is a source cell (S-Cell), and wherein the problem information includes identify information of the S-Cell when the handover failure occurs, and the identify information of the S-Cell includes at least one of frequency, a physical cell identity (PCI), a cell global identity (CGI), an IP, and a PLMN ID of the S-Cell.

14. The base station of claim 10, wherein the new cell is a target cell (T-Cell), and wherein the problem information includes identify information of the T-Cell when the handover failure occurs, and the identify information of the T-Cell includes at least one of a frequency, a physical cell identity (PCI), a cell global identity (CGI), an IP, and a PLMN ID of the T-Cell.

15. The base station of claim 10, wherein the previous cell is a source cell (S-Cell), and wherein the problem information includes identity information of a tracking area (TA) of the S-Cell when the handover failure occurs.

16. The base station of claim 10, wherein the problem information includes identity information of the UE, and the identify information of the UE includes a cell-radio network temporary identity (C-RNTI) of the UE, a temporary mobile subscriber identity (TMSI) of the UE, or an international mobile subscriber identity (IMSI) of the UE.

17. The base station of claim 10, wherein the transmitter is configured to transmit the problem information to the another base station controlling the cell where the handover failure occurs through an interface between the base station and the another base station; or through transference of a mobility management entity (MME) in a core network, an element management system (EMS), or a network management system (NMS).

18. A method for detecting a radio network problem, the method comprising:
receiving, by a first base station controlling a new cell that a radio resource control (RRC) connection is reestablished or established with a user equipment (UE), problem information indicating a handover failure occurred on the UE in a previous cell controlled by a second base station, after the RRC connection is established; and
transmitting, by the first base station, the problem information to the second base station controlling the previous cell where the handover failure occurs, upon receiving the problem information from the UE, wherein the problem information is used by the second base station to perform a problem analysis to the handover failure according to the problem information, and to perform parameter optimization to solve the handover failure.

19. The method of claim 18, wherein the previous cell is a source cell (S-Cell) and the new cell is a target cell (T-Cell), and wherein the problem information includes signal quality of at least one of the S-Cell and the T-Cell.

20. The method of claim 19, wherein the signal quality includes at least one of reference signal received power (RSRP) and reference signal received quality (RSRQ).

21. The method of claim 18, wherein the previous cell is a source cell (S-Cell), and wherein the problem information includes identify information of the S-Cell when the handover failure occurs, and the identify information of the S-Cell includes at least one of frequency, a physical cell identity (PCI), a cell global identity (CGI), an IP, and a PLMN ID of the S-Cell.

22. The method of claim 18, wherein the new cell is a target cell (T-Cell), and wherein the problem information includes identify information of the T-Cell when the handover failure occurs, and the identify information of the T-Cell includes at least one of frequency, a physical cell identity (PCI), a cell global identity (CGI), an IP, and a PLMN ID of the T-Cell.

23. The method of claim 18, wherein the previous cell is a source cell (S-Cell), and wherein the problem information includes identity information of a tracking area (TA) of the S-Cell when the handover failure occurs.

24. The method of claim 18, wherein the problem information includes identity information of the UE, and the identify information of the UE includes a cell-radio network temporary identity (C-RNTI) of the UE, a temporary mobile subscriber identity (TMSI) of the UE, or an international mobile subscriber identity (IMSI) of the UE.

25. The method of claim 18, wherein in transmitting the problem information, the first base station transmits the problem information to the second base station through an interface between the first and second base stations; or through transference of a mobility management entity (MME) in a core network, an element management system (EMS), or a network management system (NMS).

26. A base station comprising:
a receiver configured to receive, from a user equipment (UE), problem information, after a radio resource control (RRC) connection is reestablished or established between the UE and a new cell controlled by the base station, wherein the problem information includes a field carrying the information that a handover failure occurred on the UE in a previous cell controlled by another base station; and
a transmitter configured to transmit the received problem information to the another base station controlling the previous cell.

27. The base station of claim 26, wherein the previous cell is a source cell (S-Cell) and the new cell is a target cell (T-Cell), and wherein the problem information includes signal quality of at least one of the S-Cell and the T-Cell.

28. The base station of claim 27, wherein the signal quality includes at least one of reference signal received power (RSRP) and reference signal received quality (RSRQ).

29. The base station of claim 26, wherein the previous cell is a source cell (S-Cell), and wherein the problem information includes identify information of the S-Cell when the handover failure occurs, and the identify information of the S-Cell includes at least one of frequency, a physical cell identity (PCI), a cell global identity (CGI), an IP, and a PLMN ID of the S-Cell.

30. The base station of claim 26, wherein the new cell is a target cell (T-Cell), and wherein the problem information includes identify information of the T-Cell when the handover failure occurs, and the identify information of the T-Cell includes at least one of a frequency, a physical cell identity (PCI), a cell global identity (CGI), an IP, and a PLMN ID of the T-Cell.

31. The base station of claim 26, wherein the previous cell is a source cell (S-Cell), and wherein the problem information includes identity information of a tracking area (TA) of the S-Cell when the handover failure occurs.

32. The base station of claim 26, wherein the problem information includes identity information of the UE, and the identify information of the UE includes a cell-radio network temporary identity (C-RNTI) of the UE, a temporary mobile subscriber identity (TMSI) of the UE, or an international mobile subscriber identity (IMSI) of the UE.

33. The base station of claim 26, wherein the transmitter is configured to transmit the problem information to the another base station controlling the cell where the handover failure occurs through an interface between the base station and the another base station; or through transference of a mobility management entity (MME) in a core network, an element management system (EMS), or a network management system (NMS).

34. A method for detecting a radio network problem, the method comprising:
receiving, by a first base station controlling a new cell that a radio resource control (RRC) connection is reestablished or established with a user equipment (UE), problem information, after the RRC connection is established, wherein the problem information includes a field carrying the information that a handover failure occurred on the UE in a previous cell controlled by another base station; and
transmitting, by the first base station, the problem information to the second base station controlling the previous cell where the handover failure occurs, upon receiving the problem information from the UE.

35. The method of claim 34, wherein the previous cell is a source cell (S-Cell) and the new cell is a target cell (T-Cell), and wherein the problem information includes signal quality of at least one of the S-Cell and the T-Cell.

36. The method of claim 35, wherein the signal quality includes at least one of reference signal received power (RSRP) and reference signal received quality (RSRQ).

37. The method of claim 34, wherein the previous cell is a source cell (S-Cell), and wherein the problem information includes identify information of the S-Cell when the handover failure occurs, and the identify information of the S-Cell includes at least one of frequency, a physical cell identity (PCI), a cell global identity (CGI), an IP, and a PLMN ID of the S-Cell.

38. The method of claim 34, wherein the new cell is a target cell (T-Cell), and wherein the problem information includes identify information of the T-Cell when the handover failure occurs, and the identify information of the T-Cell includes at least one of frequency, a physical cell identity (PCI), a cell global identity (CGI), an IP, and a PLMN ID of the T-Cell.

39. The method of claim 34, wherein the previous cell is a source cell (S-Cell), and wherein the problem information includes identity information of a tracking area (TA) of the S-Cell when the handover failure occurs.

40. The method of claim 34, wherein the problem information includes identity information of the UE, and the identify information of the UE includes a cell-radio network temporary identity (C-RNTI) of the UE, a temporary mobile subscriber identity (TMSI) of the UE, or an international mobile subscriber identity (IMSI) of the UE.

41. The method of claim 34, wherein in transmitting the problem information, the first base station transmits the problem information to the second base station through an interface between the first and second base stations; or through transference of a mobility management entity (MME) in a core network, an element management system (EMS), or a network management system (NMS).

* * * * *